US005352503A

United States Patent [19]

Drake et al.

[11] Patent Number: 5,352,503

[45] Date of Patent: Oct. 4, 1994

[54] RECORDING PAPER FOR INK JET RECORDING PROCESSES

[75] Inventors: Mark C. Drake, Springfield; Alex J. Miklasiewicz, Holyoke, both of Mass.

[73] Assignee: Rexham Graphics Inc., South Hadley, Mass.

[21] Appl. No.: 947,571

[22] Filed: Sep. 21, 1992

[51] Int. Cl.$^5$ ............................................ B32B 9/00

[52] U.S. Cl. .................................... 428/195; 428/211; 428/219; 428/520; 346/135.1; 346/106

[58] Field of Search ............... 428/195, 201, 204, 206, 428/331, 913, 211, 219, 520, 914; 346/1.1, 135.1

[56] References Cited

U.S. PATENT DOCUMENTS

| | | | |
|---|---|---|---|
| 4,065,415 | 12/1977 | Christenson et al. | 260/17.4 SG |
| 4,113,900 | 9/1978 | Lawton | 427/207 R |
| 4,209,584 | 6/1980 | Joseph | 430/527 |
| 4,290,931 | 9/1981 | Nölken et al. | 260/29.6 RW |
| 4,474,847 | 10/1984 | Schroeder et al. | 428/323 |
| 4,481,244 | 11/1984 | Haru et al. | 428/155 |
| 4,528,242 | 7/1985 | Burwasser | 428/413 |
| 4,592,954 | 6/1986 | Malhotra | 428/335 |
| 4,732,786 | 3/1988 | Patterson et al. | 427/261 |
| 4,833,002 | 5/1989 | Sinclair | 428/195 |
| 4,849,286 | 7/1989 | Milne | 428/336 |
| 4,910,048 | 3/1990 | Sinclair et al. | 427/208.6 |
| 4,935,307 | 6/1990 | Iqbal et al. | 428/500 |
| 4,960,687 | 10/1990 | Cho | 430/527 |
| 5,068,140 | 11/1991 | Malhotra et al. | 428/216 |
| 5,204,404 | 4/1993 | Werner, Jr. et al. | 524/501 |
| 5,254,403 | 10/1993 | Malhotra | 428/336 |

FOREIGN PATENT DOCUMENTS

| | | |
|---|---|---|
| 0486137A1 | 5/1992 | European Pat. Off. . |
| 0487350A1 | 5/1992 | European Pat. Off. . |

*Primary Examiner*—Patrick J. Ryan
*Assistant Examiner*—William Kaynski
*Attorney, Agent, or Firm*—Burns, Doane, Swecker & Mathis

[57] ABSTRACT

The present invention provides one with a recording paper useful in ink jet recording processes. The recording paper is comprised of a substrate and a coating, with the coating comprising a pigment and a binder. The binder contains a water-soluble polymer, such as polyvinyl alcohol, and a curl behavior enhancing amount of a polyether, e.g., a polyalkylene glycol such as polyethylene glycol. Generally, the polyether has an average molecular weight of at least 400. The use of the present ink jet recording paper has been found to exhibit excellent imaging performance as well as superior curl behavior.

21 Claims, No Drawings

RECORDING PAPER FOR INK JET RECORDING PROCESSES

BACKGROUND OF THE INVENTION

This invention relates to a coated paper which is suitable as a recording sheet for use in an ink jet recording process. In particular, this invention relates to such a recording sheet which exhibits excellent curl and imaging behavior.

Ink jet printing systems generally are of two types, continuous stream and drop-on-demand. In drop-on-demand systems, a droplet is expelled from an orifice directly to a position on a recording medium in accordance with digital data signals. A droplet is not formed or expelled unless it is to be placed on the recording medium. There are two types of drop-on-demand ink jet systems. One type of drop-on-demand system has as its major components in an ink-filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high-quality copies. Drop-on-demand systems which use piezoelectric devices to expel the droplets also suffer the disadvantage of a slow printing speed.

The second type of drop-on-demand system is a thermal ink jet, or bubble jet, and produces high-velocity droplets and allows very close spacing of nozzles. The major components of this type of drop-on-demand system are an ink-filled channel having a nozzle on one end and a heat generating resistor near the nozzle. Printing signals representing digital information originate an electric current pulse in a resistive layer within each ink passageway near the orifice or nozzle causing the ink in the immediate vicinity to evaporate almost instantaneously and create a bubble. The ink at the orifice is forced out as a propelled droplet as the bubble expands. When the hydrodynamic motion of the ink stops, the process is ready to start all over again.

Ink jet printers of the continuous stream type employ printheads having one or more orifices or nozzles from which continuous streams of ink droplets are emitted and directed toward a recording medium. The stream is perturbed, causing it to break up into droplets at a fixed distance from the orifice. Printing information is transferred to the droplets of each stream by electrodes that charge the passing droplets, which permits each droplet to be individually charged so that it may be positioned at a distinct location on the recording medium or sent to the gutter for recirculation. As the droplets proceed in flight from the charging electrodes toward the recording medium, they are passed through an electric field which deflects each individually charged droplet in accordance with its charge magnitude to specific pixel locations on the recording medium. The continuous stream ink jet process is described, for example, in U.S. Pat. No. 4,255,754, U.S. Pat. No. 4,698,123, and U.S. Pat. No. 4,751,517.

Papers coated with materials compatible with ink jet inks are known. For example, U.S. Pat. No. 4,478,910 discloses an ink jet recording paper comprising a base sheet with a coating layer comprising a water-soluble polymeric binder and fine silica particles. The polymeric binder may include polyvinyl alcohol or its derivatives, water soluble cellulose derivatives, water soluble polymeric substances such as polyvinyl pyrrolidone, or the like.

U.S. Pat. No. 4,758,461 discloses a recording paper suitable for ink-jet comprising a fibrous substrate paper on the surface of which a silicon containing type pigment and a fibrous material of the substrate paper are present in a mixed state. The paper can also contain an aqueous binder such as one or a mixture of two or more water-soluble or water-dispersed polymers such as polyvinyl alcohol, starch, oxidized starch, cationized starch, casein, carboxymethyl cellulose, gelatin, hydroxyethyl cellulose, SBR latex, MBR latex, vinyl acetate emulsion, and the like.

U.S. Pat. No. 4,780,356 discloses a recording sheet suitable for ink jet printing comprising a sheet of paper and porous particles on the paper surface. The particles can be coated on a paper surface by means of a binder such as polyvinyl alcohol.

U.S. Pat. No. 4,474,847 discloses a coated base paper for use in an ink jet recording process wherein the coating comprises a pigment and/or filler of non-flake structure and a binding agent dried on the paper. The pigment content is at least about 90 percent by weight of the dried coating, and the binding agent is predominantly hydrophilic.

U.S. Pat. No. 4,686,118 discloses a recording medium having an ink receiving layer provided on a substrate. The ink receiving layer comprises at least a mixture of a polymer capable of forming intermolecular hydrogen bonds and a polymer incapable of forming intermolecular hydrogen bonds. The substrate can be opaque, e.g., paper, wood, metal plate, or transparent, e.g., polyester film.

U.S. Pat. No. 4,554,181 discloses an ink jet recording sheet having a recording surface which includes a combination of a water soluble polyvalent metal salt and a cationic polymer, said polymer having cationic groups which are available in the recording surface for insolubilizing an anionic dye.

U.S. Pat. No. 4,617,239 discloses a method of coating paper to improve its surface strength and printability by applying to the paper a silicon-containing modified polyvinyl alcohol agent or its saponification product. The coating agent forms a film on the surface of the paper which minimizes the penetration of the coating into the paper and improves the surface strength and printability of the paper. The coating agent may be incorporated with other coating compounds, including synthetic resin emulsions such as styrene-butadiene latex, polyacrylate ester emulsion, polyvinyl acetate emulsion, vinyl acetate-acrylate ester copolymer emulsion, and vinyl acetate-ethylene copolymer emulsion. Further, the coating agent may be incorporated with pigments such as clay, calcium carbonate, titanium dioxide, satin white, zinc oxide, silica, aluminum oxide, and cadmium sulfide.

U.S. Pat. No. 4,481,244 relates to a recording sheet which comprises a substrate and a coating layer formed thereon of a coating material containing a polymer having both hydrophilic segments and hydrophobic segments.

One of the important physical properties a paper recording medium should possess is the ability to remain flat over a wide range of humidities. Unacceptable curling of a recording medium over time can occur, particularly when the humidity in the surrounding environment changes. The root cause of curl in recording papers for ink jet processes is the differential in hydroexpansivity between the coating and the paper. The paper and coating absorb different quantities of water at a given humidity, thereby causing swelling or shrinking differentially, resulting in unacceptable curl with changes in humidity.

There are many well-documented methods employed to yield moisture sensitive materials having good curl characteristics. It is important, however, that any method used must not affect imaging performance. The physical properties, e.g., sheet stiffness and functional characteristics of the sheet, must not be compromised by the actions taken to yield a product with good curl characteristics.

A commonly used technique is the addition of a second coating to the backside of the recording sheet. This coating is applied to counteract any shrinkage or swelling resulting from the functional top coating. The back coating may generally include the same coating as the top coat, e.g., polyvinyl alcohol, full or partially hydrolyzed, various starches or carboxymethylcellulose. The addition of a second coating to balance the differential hydroexpansivity, however, adds cost and may not reduce the curl to the desired extent in cases where precise amounts of the two coatings are needed.

Applying an aqueous impermeable coating to both sides renders the base paper dimensionally stable, but curling due to shrinking and swelling of the functional coating will still occur. Moreover, the addition of this layer may greatly reduce the receptive ability for the aqueous inks.

Partial chemical cross-linking such as in water miscible urea formaldehyde systems can be used to improve curling characteristics. This mechanism would bind the water receptive polymer with the cross-linked network, yielding it unreactive. This technique would not remove the reactivity of the base paper, however, and has long cure times.

Ink jet recording papers therefore still have problems today in avoiding unacceptable curl over a wide range of humidities. The search continues for a recording paper useful in ink jet recording processes which exhibits excellent curl behavior over a wide range of humidities, but which also is economical and capable of excellent imaging.

An object of the present invention, therefore, is to provide a coated ink jet recording paper which avoids the problems of curl, particularly upon a change of relative humidity.

Another object of the present invention is to provide a paper recording medium for ink jet recording processes which has excellent imaging properties and exhibits excellent properties with respect to dimensional stability, specifically curl behavior.

Still another object of the present invention is to provide a recording paper useful in ink jet recording processes which is economically and easily manufactured while providing the desired imaging performance and curl behavior.

These and other objects of the present invention will become apparent upon a review of the following specification and the claims appended thereto.

SUMMARY OF THE INVENTION

In accordance with the foregoing objectives, the present invention provides a recording paper comprised of a substrate and a coating. The coating comprises a pigment and a binder, with the binder being comprised of a water soluble polymer and a curl behavior enhancing amount of a polyether, e.g., a polyalkylene glycol, with polyethylene glycol being the most preferred polyalkylene glycol. Generally, the amount of polyether employed is at least 15 wt % based upon the weight of the dry coating. In one embodiment, the average molecular weight of the polyether is at least 400.

It has been found that the recording paper of the present invention exhibits excellent curl behavior, i.e., the curl remains between ±10 mm curl, as measured from a flat surface, over humidities of 20% relative humidity at 15° C. to 80% relative humidity at 30° C., without sacrificing imaging quality.

DETAILED DESCRIPTION OF THE PREFERRED EMBODIMENTS

The recording paper of the present invention useful for ink jet recording comprises a cellulosic substrate and a coating. The paper substrate is preferably sized. Sizing refers to water resistance, which is endowed to a cellulosic paper structure by hydrophobic internal or external treatments during paper making, such as the addition of rosin acids and starch. Typically, sizing is expressed in terms of the time taken for a given volume of a water-based liquid to penetrate the paper structure. World wide, several standard methods have been adopted. In North America, the Hercules sizing test is the one most commonly used. Another sizing standard is the Stöckigt sizing degree. The sized substrate is believed to enable minimized penetration of the coating into the substrate paper, resulting in a distinct pigmented coating on the paper surface as opposed to a coating that has penetrated the paper fibers to a significant degree. Limited penetration of the coating into the substrate enables advantages for color ink jet printing, such as providing a microscopically smooth surface affording symmetric spreading and negligible feathering of ink images, high and uniform optical density, high-color saturation, rapid ink absorption, and minimum intercolor bleed of juxtaposed solid areas. Such substrate papers are commercially available, e.g., from James River Corporation. The paper can also contain a commercially available filler.

The coating for the recording paper of the present invention generally comprises a pigment and a binder. The binder is comprised of a water-soluble resin which forms a good film, and a polyether such as a polyalkylene glycol. The water-soluble resin suitable for the purposes of the present invention include polyvinyl alcohol, carboxylated polyvinyl alcohol, starch, casein, gum arabic, gelatin, polyacrylamide, hydroxy alkyl cellulose, carboxymethylcellulose, polyvinyl pyrrolidone, sodium polyacrylate, sodium alginate, alkalinically soluble copolymers of styrene and maleic acid anhydride, polyaminoamide resins, and the like. Appropriate copolymers and mixtures of such polymers can also be used as long as the resin is suitably water-soluble and compatible with the polyether component of the binder. Polyvinyl alcohol is the most preferred water-soluble resin for use in the binder.

The polyvinyl alcohol component of the binder generally is hydrolyzed, preferably to at least 87% and more preferably to at least 99%. Examples of commercially available polyvinyl alcohols suitable for the coatings of the present invention include the polyvinyl alcohols available under the trademarks AIRVOL 125, AIRVOL 107, AIRVOL 325, and AIRVOL 350 of Air Products and Chemicals, Inc., of Allentown, Pa., and R-1130 available from Kuraray, Inc., of Japan. The polyvinyl alcohol is present in the coating generally in the range of from about 40 wt. % or less, and more preferably in the range of from about 10 to about 30 wt. %, and most preferably in the range of from about 15 to about 25 wt %, based upon the weight of the dry coating.

The additional binder material used in the coating composition of the recording paper of the present invention imparts to the ink jet recording paper the improvements in curl characteristics. This additional binder material is a polyether, e.g., a polyalkylene glycol. The preferred polyalkylene glycol is polyethylene glycol, however, other polyalkylene glycols such as polypropylene glycol may also be used. The preferred average molecular weight of the polyether employed is generally at least 400, but preferably ranges from about 700 to about 3,500, and most preferably from about 1,000 to about 2,000. These molecular weights have been found most suitable for the paper substrates and amounts of polyether preferably used to date. However, these can vary greatly.

The amount of polyether employed in the binder can be any amount which enhances curl behavior, but is generally at least about 15 wt. % based upon the weight of the dry coating. It is more preferable that the amount of polyether present is in the range of about 15 to 50 wt. %, and most preferably in the range of about 20 to 35 wt. % based upon the weight of the dry coating.

Within the ranges described above, the molecular weight and amount of polyether can vary depending on the particular base paper, the type or amount of pigment in the coating, or the water soluble resin employed in the binder. As the base paper, pigment amount or water soluble resin is changed, the amount of polyether needed to optimize curl behavior will change. The amount of polyether to be employed will also vary with the average molecular weight of the polyether. In general, however, given a particular base paper and water soluble resin, a curl behavior enhancing amount of a polyether of a suitable molecular weight, generally within the above-described ranges, can be readily determined within the confines of the present invention.

The pigment can be any suitable ink absorbing pigment, as the pigment is primarily intended for physical adsorption and capture of the coloring material, e.g., dye, of the ink applied onto the coating layer. Materials effectively used for this purpose are white porous inorganic pigments having an ionic property on the particle surface. Such pigments include natural zeolites, synthetic zeolites, diatomaceous earth, finely divided silica (average particle size up to 1 micron), powdered silica (average particle size up to 20 microns) and synthetic mica. Other suitable pigment materials include calcium carbonate, magnesium carbonate, barium sulfate, titanium dioxide, magnesium titanate, calcium silicate, aluminum oxide or hydroxide and satin white. These pigments can be used, each alone or in mixture with one another. The amount of pigment employed in the coating can vary greatly, but is generally about 60 wt. % or less, and more preferably in the range of about 25 to about 50 wt. % based upon the weight of the dry coating.

Other suitable additives may be incorporated into the coating. Such additives include thickeners, antioxidants, dye mordants, and optical brighteners, which are well known to the art. These additives can be added in any suitable functional amount. For example, it is preferred that a dye mordant be added in an amount of from about 5 to 15 weight percent.

In the preparation of the coating, the water-soluble polymer, e.g., polyvinyl alcohol, and thickener are first combined and then heated, e.g., cooked. The solution is then cooled to about ambient temperature. The pigment is then dispersed in water, to which dispersion is added all other additives, the polyether and the water-soluble resin solution. It is preferred that the water-soluble resin solution is cooled prior to adding the polyethylene glycol or other polyether in order to ensure that the polyether does not come out of solution and separate.

Once the coating solution has been made, it can be coated upon the base paper using conventional methods. The coating can be applied, for example, by blade coating, knife coating, wire-wound rod coating, roll coating, or any other suitable coating technique. The solution of water and coating composition can have any desired solids content, for example, from 5 to about 25 wt. %. Different coating methods will have different optimal solids contents. The coating can be applied in any effective thickness or coating weight. The dry coating thickness can be of any desired value, with typical values being from about 10 to about 30 micron. Subsequent to coating, the receiver sheet is dried by any suitable process, such as exposure to ambient air conditions, drying with a hot air gun blow drier, a drum drier, an oven, or the like.

The resulting recording paper of the present invention exhibits excellent pre-imaging curl behavior without sacrificing image quality. The recording paper is quite useful for ink jet recording processes. Due to its excellent pre-imaging curl behavior, such a recording paper can avoid unacceptable curling upon exposure to a wide variance in humidity during storage and/or prior to printing. The excellent curl behavior also improves the post-printing characteristics of the printed sheet. Therefore, the recording paper of the present invention allows one to obviate the problem of unacceptable curling which haunts the ink jet industry.

The invention will be illustrated in greater detail by the following specific Examples. It is understood that these Examples are given by way of illustration and are not meant to limit the disclosure of the claims to follow. All percentages in the Examples and elsewhere in the specification, are by weight unless otherwise specified.

Generally, the ink jet recording papers employed in the Examples were prepared from a base paper which had coated onto it an ink receptive coating layer. The base paper porosity and internal sizing level had been optimized with the ink receptive layer for optimum dot size and optical density. The base paper employed had a caliper of about 3.7 mils and a basis weight of 52 lb/3000 sq. ft.

The coating composition for the ink receptive layer was prepared following the general procedure of combining cold water with polyvinyl alcohol and a thickener, i.e., KEGLIN LV available from Merck & Co., Inc., and mixed for 5 minutes. The mixture was then heated to 200° F. to 210° F. for 45 minutes. Water was added to the mixture to bring the total weight of the batch to the desired level, followed by slow mixing for about 5 minutes. A silica pigment was then combined with cold water and mixed for 20 minutes. The previous batch containing the polyvinyl alcohol, along with a dye mordant (a cation polymer available under the trademark CYPRO 515 from American Cyanamid) and CARBOWAX (polyethylene glycol) available from Union Carbide, was added to the silica solution. The entire mixture was then slowly mixed with the addition of sodium hydroxide to adjust the pH to 7.0 (plus or minus 0.5). TINOPAL PT, an optical brightener available from Intracolor Corporation, was then added along with water to achieve the final desired weight of the batch, with mixing. For the control batch, the polyethylene glycol (CARBOWAX) was simply excluded from the foregoing procedure.

The ink receptive layer was coated into the base paper using the following general procedure. The ink receptive layer was coated by a roll coating process onto the paper substrate and dried by hot air impingement. A second coating was applied to the back of the web using a roll coater to remove the curl induced by the initial wetting and drying of the coating. The finished roll was then hand cut into 8.5" by 11" sheets for curl testing.

Paper curl was measured by placing a minimum of 10 unimaged samples with the ink receptive coating facing up and an equivalent number of samples with the ink receptive coating facing down, having dimensions of 8.5"×11" onto a flat stainless steel surface. The highest corner above the flat surface for each sheet was measured with a plastic ruler having divisions in millimeters. The resulting curl was measured to the nearest millimeter and recorded. Both mean curl and delta curl measurements were taken.

Mean Curl—Mean curl was measured at the relative humidities (RH); 20% RH at 15° C., 50% RH at 22° C., and 80% RH at 30° C. The procedure employed for measuring mean curl was as follows: 1) all mean curl samples were first equilibrated at 50% RH and 22° C. (initial humidity) for one hour; 2) the RH and temperature was then changed to the mean level of interest (final humidity). The change from 50% RH to 22° C. to the new RH was conducted over a 30 minute period; 3) after the samples reached the final humidity level they were maintained at that level for an hour; 4) the highest corner for each sheet was measured and recorded.

Delta Curl—The change in curl resulting from a given change in RH at constant temperature is called the "delta curl". All delta curl measurements were conducted at 22° C. There were two delta curl measurements conducted: 1) the first delta curl measurement was initially equilibrated at 50% RH for one hour and the highest corner for each sample recorded. The RH was then changed to 20% RH over a 30 minute period. The samples were then equilibrated for one hour at 20% RH and the highest corner for each sample was measured. The difference between the 50% RH and 20% RH highest corners for each sheet was recorded. This was called the "50 to 20% delta curl"; 2) the second delta curl measurements were taken by initially equilibrating the samples at 50% RH for one hour. The RH was then changed to 80% RH over a 30 minute period. The samples were equilibrated at 80% RH for one hour and the highest corner for each sample was recorded. The RH was then changed to 50% RH over a 30 minute period. The samples were equilibrated at 50% RH for one hour and the highest corner for each sample was recorded. The difference between the 80% RH and 50% RH highest corners for each sheet was recorded. This was called the "80 to 50% delta curl".

The image quality of the various samples was also noted. Image quality was a subjective test where the invention was compared to standard production made similarly to that of Example 1. The categories were image vibrancy, bleed, mottle, and banding. Image vibrancy refers to how "snappy" the image looks. Bleed is a measure of the dot spread and is ascertained by looking at the fill of a fine white line on a solid blue background. The more the thin white line is filled the worse the bleed. Mottle is a subtle defect where the paper formation shows up in the image. Banding is where the dots are too small and the drops of ink do not spread enough such that passes of the printhead result in discrete bands, particularly in uniform color areas.

A PaintJet XL printer was utilized in this test with a full ink coverage pattern generated with Freelance for Windows Version 1.0 utilizing the SmartMaster template WORLD2.MAS.

Each category was given a rating between 1 and 3, where 1 is better, 2 is equivalent, and 3 is worse than standard production paper. A final overall rating was then given for each design.

EXAMPLE 1

A product was prepared using the general procedure described above, except that the polyethylene glycol was excluded, so that the mixture was a control mixture. The mixture included 51 parts by weight of silica pigment (available under the trademark Silicon G-100 of SCM Chemicals), 35.1 parts by weight of a polyvinyl alcohol (available under the trademark AIRVOL 325 of Air Products and Chemicals, Inc.), 3.9 parts by weight of a thickener (available under the trademark KELGIN LV of Merck & Co., Inc.), and 10 parts by weight of a dye mordant (available under the trademark CYPRO 515 of American Cyanamid). The mix was applied to a machine glazed paper manufactured by James River Corporation using the technique described above. The resulting recording paper was then tested for its curl behavior and imaging quality in accordance with the above-described procedures. The results were recorded and are set forth in the table below. The results are also shown in the graph of FIG. 1.

As graphically depicted in FIG. 1, both of the paths, from 80% to 50% relative humidity, representing summer conditions, and from 50% to 20% relative humidity, representing winter conditions, give unacceptable curl behavior.

EXAMPLE 2

The procedure of Example 1 was followed, except the mix included a loading of 30% by wt. of polyethylene glycol with respect to the weight of dry coating. The polyethylene glycol had a molecular weight of 1,000. The base paper used was a machine-finished paper manufactured by James River Corporation. The curl measurements were taken and recorded, and are graphically depicted in FIG. 2.

As can be seen from FIG. 2, a superior curl behavior compared to the standard depicted in FIG. 1 was obtained.

EXAMPLE 3

The procedure of Example 2 was followed except that the mix was coated onto a machine-glazed paper made by James River Corporation as in Example 1, and the molecular weight of the polyethylene glycol was 1,450. Also, a 16% solution of the polyethylene glycol was applied as a back coating to the sample.

The curl performance was recorded and is graphically depicted in FIG. 3. FIG. 3 shows the superior curl performance that the invention has in comparison to FIG. 1.

EXAMPLES 4–7

In Examples 4 to 7, the mix was prepared according to the general procedure described above. Application of the ink receptive layer was also made by the general procedure described above. The base paper used was a machine finished base paper in Example 4, and a machine-glazed base paper in Examples 5–7. The following Table sets forth the various amounts of components employed in each of the experimental runs, as well as the results thereof.

TABLE

| | Ex. 1 (Control) | Ex. 2 (Invention) | Ex. 3 (Invention) | Ex. 4 (Invention) | Ex. 5 (Invention) | Ex. 6 (Invention) | Ex. 7 (Invention) |
|---|---|---|---|---|---|---|---|
| Dry Weight of Coating (lbs/3000 sq ft) | 1.6 | 2.0 | 2.1 | 2.4 | 2.0 | 2.1 | 1.9 |
| % Solids | 10.5 | 12 | 12 | 12 | 12 | 12 | 10.5 |
| Paper Base Finish | MG | MF | MG | MF | MG | MG | MG |
| Dry Coating (parts by weight): | | | | | | | |
| Silica (SILCRON G-100) | 51 | 34 | 34 | 40 | 34 | 50 | 40 |
| Polyvinyl Alcohol (AIRVOL 325) | 35.1 | 23.4 | 23.4 | 27 | 23.4 | 17.1 | 15.3 |
| Thickener (KELGIN LV) | 3.9 | 2.6 | 2.6 | 3 | 2.6 | 1.9 | 1.7 |
| Dye Mordant (CYPRO 515) | 10 | 10 | 10 | 10 | 10 | 10 | 10 |
| PEG 1000 | 0 | 30 | 0 | 20 | 0 | 0 | 0 |
| PEG 1450 | 0 | 0 | 30 | 0 | 30 | 21 | 33 |
| Back Coat of PEG 1450 | no | no | yes | no | no | no | yes |
| Curl: | | | | | | | |
| Mean Curl - 20% RH, 15° C. | 45 | 5 | 1 | — | −3 | 4 | 4 |
| Mean Curl - 50% RH, 22° C. | −2 | −4 | −5 | 2 | −9 | −10 | −1 |
| Mean Curl - 80% RH, 30° C. | −3 | 0 | −5 | — | −10 | −17 | 1 |
| Delta Curl 50 to 20% RH | 40 | 9 | 9 | 9 | 6 | 11 | 4 |
| Delta Curl 80 to 50% RH | 20 | 6 | 12 | 4 | 6 | 8 | 4 |
| Image Quality: | | | | | | | |
| Vibrancy | 2 | 2.5 | 2.5 | 2 | 2.5 | 1 | 1 |
| Mottle | 2 | 3 | 2 | 3 | 2 | 2 | 2 |
| Banding | 2 | 2 | 2 | 2 | 2 | 3 | 2.25 |
| Overall Image Quality | 2 | 2.5 | 2 | 2.25 | 2 | 2 | 1.75 |

In the Table, a (−) sign means curl to the uncoated side. All curl measurements are reported in millimeters. MG refers to a machine glazed paper and MF refers to a machine finished paper.

As can be seen from the foregoing Table, those compositions including the polyethylene glycol in the receptive layer provided superior curl control over the standard composition having no polyethylene glycol. By incorporating a polyalkylene glycol having a sufficient molecular weight into the coating in sufficient amounts, therefore, the curl behavior of the recording paper is surprisingly enhanced without sacrificing image performance.

While the invention has been described with preferred embodiments, it is to be understood that variations and modification may be resorted to as will be apparent to those skilled in the art. Such variations and modifications are to be considered within the purview and the scope of the claims appended hereto.

What is claimed is:

1. A recording paper useful in ink jet recording comprised of a cellulose substrate and a coating, with the coating comprising a pigment and a binder, said binder being comprised of a water-soluble resin and a polyether, with the amount of polyether contained in the coating being at least 15 wt. % based on the total weight of the dry coating.

2. The recording paper of claim 1, wherein the polyether is polypropylene glycol or polyethylene glycol.

3. The recording paper of claim 1, wherein the amount of polyether contained in the coating is in the range of from about 15 to about 50 wt. % based on the total weight of the dry coating.

4. The recording paper of claim 1, wherein the amount of polyether contained in the coating is in the range of from about 20 to about 35 wt. % based upon the total weight of the dry coating.

5. The recording paper of claim 1, wherein the average molecular weight polyether contained in the coating is at least 400.

6. The recording paper of claim 1, wherein the water soluble resin is polyvinyl alcohol.

7. The recording paper of claim 1, wherein the coating further comprises a dye mordant.

8. The recording paper of claim 1, wherein the average molecular weight of the polyether in the coating is in the range of from about 700 to about 3,500.

9. The recording paper of claim 1, wherein the average molecular weight of the polyether in the coating is in the range of from about 1,000 to about 2,000.

10. The recording paper of claim 1, wherein the coating is comprised of polyvinyl alcohol and polyethylene glycol.

11. The recording paper of claim 10, wherein the average molecular weight of the polyethylene glycol is in the range of from about 1,000 to about 2,000.

12. The recording paper of claim 10, wherein the coating further comprises a dye mordant.

13. The recording paper of claim 10, wherein the polyethylene glycol is present in the coating in an amount ranging from about 20 to about 35 wt. % based upon the total weight of the dry coating.

14. The recording paper of claim 12, wherein the coating further comprises a dye mordant and the polyethylene glycol is present in the coating in an amount ranging from about 20 to about 35 wt. % based upon the total weight of the dry coating.

15. The recording paper of claim 1, wherein the recording paper further comprises a back coat.

16. The recording paper of claim 14, wherein the recording paper further comprises a back coat.

17. A process for generating images in an ink jet printing apparatus, comprising incorporating the recording paper of claim 1 into said ink jet printing apparatus, and forming an image on the ink jet recording paper by causing ink to be expelled onto the coated surface.

18. The process of claim 17, wherein the ink is of different colors so that the image formed on the recording paper is a color image.

19. The process of claim 17, wherein the recording paper incorporated into the ink jet printing apparatus has a coating comprised of polyvinyl alcohol and polyethylene glycol.

20. A recording paper useful in ink jet recording comprised of a cellulose substrate and a coating, with the coating comprising a pigment and a binder, said binder being comprised of a water soluble resin and a polyether having an average molecular weight of at least about 1,000, and with the amount of polyether contained in the coating being at least 15 weight % based on the total weight of the dry coating.

21. The recording paper of claim 20, wherein the polyether is polypropylene glycol or polyethylene glycol.

* * * * *